(12) United States Patent
Ueo

(10) Patent No.: US 12,623,619 B2
(45) Date of Patent: May 12, 2026

(54) POWER SUPPLY SYSTEM

(71) Applicant: TOYOTA JIDOSHA KABUSHIKI KAISHA, Toyota (JP)

(72) Inventor: Daisuke Ueo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/918,086

(22) Filed: Oct. 17, 2024

(65) Prior Publication Data

US 2025/0236248 A1     Jul. 24, 2025

(30) Foreign Application Priority Data

Jan. 23, 2024     (JP) ................................. 2024-008036

(51) Int. Cl.
B60R 16/033          (2006.01)
B60L 50/51          (2019.01)
(Continued)

(52) U.S. Cl.
CPC ............ B60R 16/033 (2013.01); B60L 50/66 (2019.02); H02J 9/061 (2013.01); B60L 50/51 (2019.02); B60L 2210/12 (2013.01)

(58) Field of Classification Search
CPC ........ B60R 16/033; B60L 50/66; B60L 50/51; B60L 2210/12; B60L 58/20; B60L 2210/10; H02J 9/061; H02J 7/342
See application file for complete search history.

(56) References Cited

U.S. PATENT DOCUMENTS

2015/0137706 A1*   5/2015  Nagashita ................. B60L 1/00
                                                  315/307
2019/0232788 A1*   8/2019  Kimura ................... B60L 53/16
                          (Continued)

FOREIGN PATENT DOCUMENTS

DE       102023005114 A1 *  6/2025  ............. B60L 1/003
EP         3616971 B1 *  7/2025  ........... B60R 16/033
JP       2013-017357 A    1/2013

OTHER PUBLICATIONS

English Translation of Foreign Document DE-102023005114-A1: Vehicle Electrical System Arrangement and Method for Precharging A High-Voltage Vehicle Electrical System (Year: 2025).*

(Continued)

*Primary Examiner* — Daniel Cavallari
*Assistant Examiner* — Terrence R Willoughby
(74) *Attorney, Agent, or Firm* — SoraIP, Inc.

(57)          ABSTRACT

The power supply system includes a high-voltage battery connected to the drive device by a high-voltage system power line, a low-voltage battery connected to the auxiliary device by a low-voltage system power line, a main power converter connected to the high-voltage system power line and the low-voltage system power line, and a bidirectional charger connected to the external power side and the high-voltage system power line for charging the high-voltage battery and supplying the voltage of the high-voltage battery to an external electric load. When a failure is detected in the main power converter, the charger power converter is controlled so as to step down the power of the high-voltage system power line by the charger power converter and supply the power to the low-voltage system power line.

5 Claims, 2 Drawing Sheets

(51) Int. Cl.
　　B60L 50/60　　　　(2019.01)
　　H02J 9/06　　　　(2006.01)

(56)　　　　　　References Cited

U.S. PATENT DOCUMENTS

| | | | | |
|---|---|---|---|---|
| 2019/0337403 A1* | 11/2019 | Tanaka | .............. | H01M 8/04228 |
| 2019/0359078 A1* | 11/2019 | Yamada | .................. | B60L 58/12 |
| 2020/0381916 A1* | 12/2020 | Oiwa | ........................ | H02H 7/12 |
| 2022/0173658 A1* | 6/2022 | Takagi | .................... | H02J 7/342 |
| 2024/0001767 A1* | 1/2024 | Lo Calzo | ................ | B60R 16/03 |
| 2024/0132222 A1* | 4/2024 | Carleial | ................ | B64D 27/34 |
| 2024/0146052 A1* | 5/2024 | Hwang | ................ | B60R 16/033 |

OTHER PUBLICATIONS

English Translation of Foreign Document EP-3616971-B1: Electric Power source system for Vehicle (Year: 2025).*

\* cited by examiner

POWER SUPPLY SYSTEM

CROSS-REFERENCE TO RELATED APPLICATION

This application claims priority to Japanese Patent Application No. 2024-008036 filed on Jan. 23, 2024, incorporated herein by reference in its entirety.

BACKGROUND

1. Technical Field

The present disclosure relates to power supply systems, and more particularly, to an in-vehicle power supply system including a high-voltage battery and a low-voltage battery.

2. Description of Related Art

Conventionally, as a power supply system of this type, there has been proposed a power supply system including a high-voltage battery attached to a high-voltage system power line connected to an inverter that drives a motor for traveling, a low-voltage battery connected to an auxiliary device through a low-voltage system power line, and a bidirectional direct current (DC)/DC converter connected to the high-voltage system power line and the low-voltage system power line to step up and down and supply electric power (see, for example, Japanese Unexamined Patent Application Publication No. 2013-017357 (JP 2013-017357 A)). The system includes a charger connected to the high-voltage system power line to charge the high-voltage battery with external electric power, and an alternating current (AC)/DC converter connected to the low-voltage system power line to supply electric power to the outside.

SUMMARY

However, in the power supply system, when the bidirectional DC/DC converters fails, the low-voltage battery can drive the auxiliary device only until the voltage of the low-voltage battery reaches a voltage at which the auxiliary machine can be driven. Therefore, the vehicle can travel in a limp home mode for only a short distance. When the low-voltage battery fails, the bidirectional DC/DC converters can supply electric power to the low-voltage system power line, though the voltage of the low-voltage system power line may become unstable, and driving of the auxiliary device may become unstable.

The power supply system of the present disclosure allows stable travel in a limp home mode over a relatively long distance even in the event of a failure.

The power supply system of the present disclosure employs the following measure in order to achieve the main object.

The power supply system of the present disclosure includes:

a high-voltage battery connected to a drive device that drives a vehicle through a high-voltage system power line;

a low-voltage battery connected to an auxiliary device mounted on the vehicle through a low-voltage system power line;

a main power converter connected to the high-voltage system power line and the low-voltage system power line to step up and down and supply electric power;

a bidirectional charger connected to the high-voltage system power line to charge the high-voltage battery with external electric power or to supply voltage of the high-voltage battery to an external electric load; and a control device that controls the main power converter and the bidirectional charger.

In the power supply system, the bidirectional charger includes a charger power converter connected to an external power side and the high-voltage system power line to step up and down and supply electric power, the charger power converter is connected to the low-voltage system power line, and when detecting a failure in the main power converter, the control device controls the charger power converter so as to step down the electric power of the high-voltage system power line by the charger power converter and supply the stepped down electric power to the low-voltage system power line.

The power supply system of the present disclosure includes a high-voltage battery connected to a drive device that drives a vehicle through a high-voltage system power line;

a low-voltage battery connected to an auxiliary device mounted on the vehicle through a low-voltage system power line;

a main power converter connected to the high-voltage system power line and the low-voltage system power line to step up and down and supply electric power;

a bidirectional charger connected to the high-voltage system power line to charge the high-voltage battery with external electric power or to supply voltage of the high-voltage battery to an external electric load; and a control device that controls the main power converter and the bidirectional charger.

The bidirectional charger includes a charger power converter connected to an external power side and the high-voltage system power line to step up and down and supply electric power, and the charger power converter is connected to the low-voltage system power line. When detecting a failure in the main power converter, the control device controls the charger power converter so as to step down the electric power of the high-voltage system power line by the charger power converter and supply the stepped down electric power to the low-voltage system power line. Accordingly, even when a failure occurs in the main power converter, the electric power of the high-voltage system power line can be stepped down and supplied to the low-voltage system power line. As a result, it is possible to stably travel in a limp home mode over a relatively long distance even when the main power converter fails.

The power supply system of the present disclosure may include an equipotential line that connects an intermediate potential part of the high-voltage battery and the low-voltage system power line, the intermediate potential part having a potential equal to a reference potential of the low-voltage system power line; and a relay attached to the equipotential line. In the power supply system, when detecting a failure in the low-voltage battery, the control device may control the relay to be turned on so that electric power is supplied to the low-voltage system power line through the equipotential line.

This makes it possible to stabilize the voltage of the low-voltage system power line even when a failure occurs in the low-voltage battery. As a result, it is possible to stably travel in a limp home mode over a relatively long distance even when the low-voltage battery fails.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
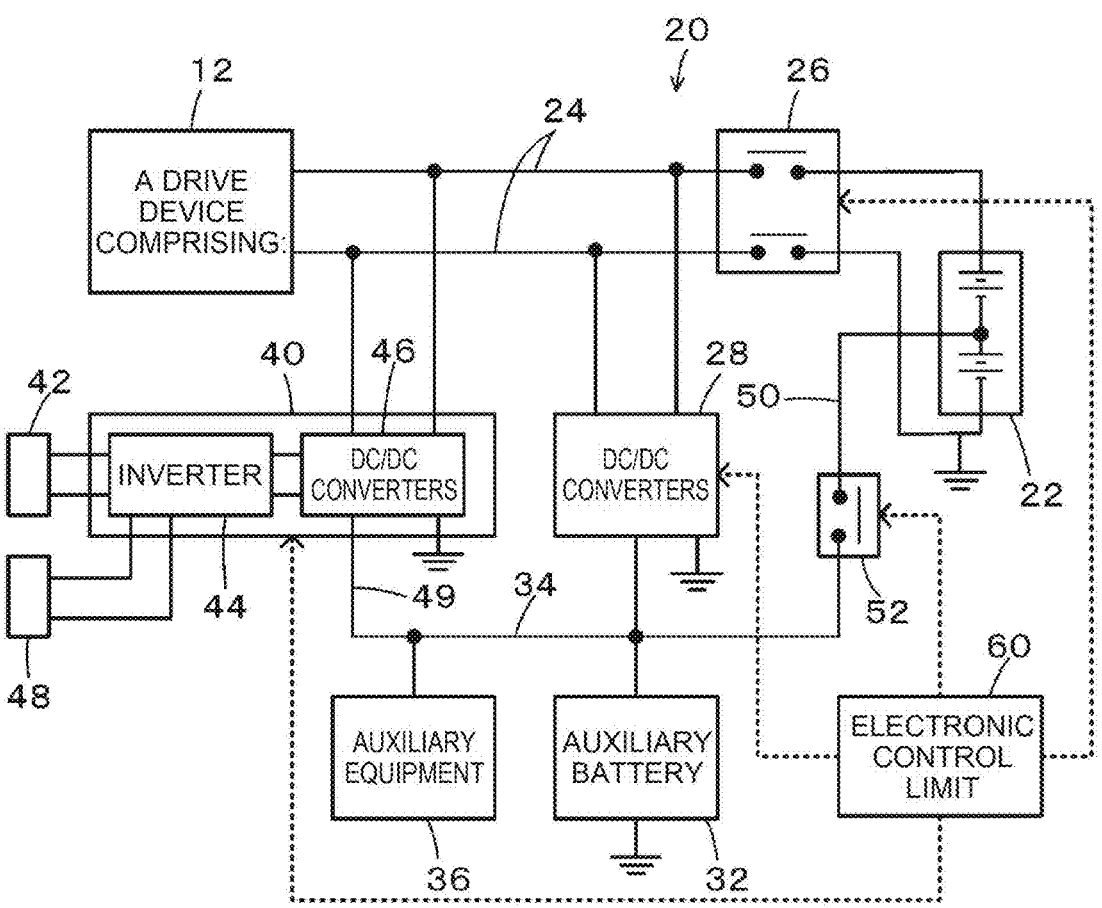
FIG. 1 is a configuration diagram schematically showing a configuration of a power supply system 20 according to an embodiment of the present disclosure.

Next, a mode (embodiment) for carrying out the present disclosure will be described. FIG. 1 is a configuration diagram schematically showing a configuration of a power supply system 20 according to an embodiment of the present disclosure. The power supply system 20 of the embodiment is configured as an in-vehicle system that supplies electric power to a drive device 12 for driving a vehicle including a three-phase AC motor, an inverter, and the like. The power supply system 20 includes a high-voltage battery 22, a DC/DC converter 28, an auxiliary device battery 32, an auxiliary device 36, a bidirectional charger 40, and an electronic control unit 60.

The high-voltage battery 22 is configured as a battery pack made of, for example, a 200 V or 400 V lithium-ion secondary battery, and is connected to the drive device 12 by a high-voltage system power line 24. A system main relay 26 is attached to the high-voltage system power line 24 so that the high-voltage battery 22 can be connected and disconnected by turning on and off the system main relay 26. A second connection line 50 is connected to the low-voltage system power line 34 at an intermediate potential part between the ground of the high-voltage battery 22 and the reference potential and the equipotential of the auxiliary device battery 32. An equipotential connection relay 52 is attached to the second connection line 50, and the equipotential connection relay 52 is turned off in a normal state.

The auxiliary device battery 32 is configured as, for example, a 12V lead-acid battery, and is connected to the auxiliary device 36 by the low-voltage system power line 34.

DC/DC converter 28 is configured as a well-known step-up/step-down capable DC/DC converter, and converts a voltage between the high-voltage system power line 24 and the low-voltage system power line 34 to bidirectionally provide power. DC/DC converter 28 typically steps down the power on the high-voltage system power line 24 to provide the low-voltage system power line 34.

The bidirectional charger 40 is connected to a connector 42 connected to an external commercial power supply, an inverter 44 connected to the connector 42, and an inverter

44. The bidirectional charger 40 further comprises DC/DC converters 46 connected to the high-voltage system power line 24 and outlet 48 connected to the inverter 44 for supplying power to external electric loads. The inverter 44 is configured as a well-known inverter, and converts AC power of a commercial power source into DC power and supplies the DC power to DC/DC converter 46, or converts DC power supplied from DC/DC converter 46 into AC power and supplies the AC power to the outlet 48. DC/DC converter 46 is configured as a well-known step-up/step-down capable DC/DC converter, and boosts the DC power from the inverter 44 to be supplied to the high-voltage system power line 24, or steps down the DC power from the high-voltage system power line 24 to be supplied to the inverter 44. DC/DC converters 46 are also connected to the low-voltage system power line 34 by the first connecting line 49, and can step down the DC power from the high-voltage system power line 24 to be supplied to the low-voltage system power line 34.

Although not shown, the electronic control unit 60 is configured as a microcomputer having a CPU as a center, and includes a ROM, a RAM, a flash memory, an input port, an output port, a communication port, and the like in addition to CPU. The electronic control unit 60 outputs a drive control signal to DC/DC converter 28, a drive control signal to the bidirectional charger 40, a drive control signal to the system main relay 26, a drive control signal to the equipotential connection relay 52, and the like from the output port.

Figure 2:
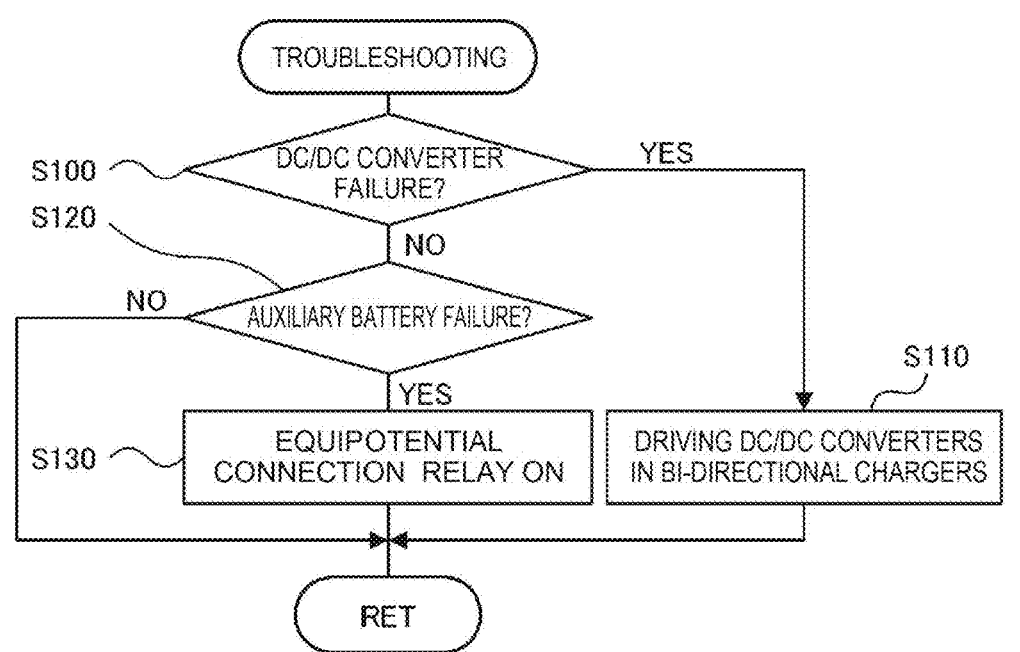
FIG. 2 is a flowchart illustrating an example of a failure process executed by the electronic control unit 60.

Next, the operation of the power supply system 20 configured as described above, in particular, the operation when a failure occurs in DC/DC converter 28 and the auxiliary device battery 32 will be described. FIG. 2 is a flowchart illustrating an example of failure processing executed by the electronic control unit 60. The processing is repeatedly performed at every predetermined time.

When the failure process is executed, the electronic control unit 60 first determines whether a failure has occurred in DC/DC converter 28 (S100). DC/DC converter failure diagnosis flag is set to a value of 1 when a failure occurs due to a failure diagnosis (not shown) of DC/DC converter 28, and to a value of 0 when no failure occurs. Whether or not a failure has occurred in DC/DC converter 28 can be determined by checking DC/DC converter failure diagnostic flag. Since the fault diagnosis of DC/DC converter 28 is not the core of the present disclosure, a detailed explanation thereof will be omitted.

Figure 3:
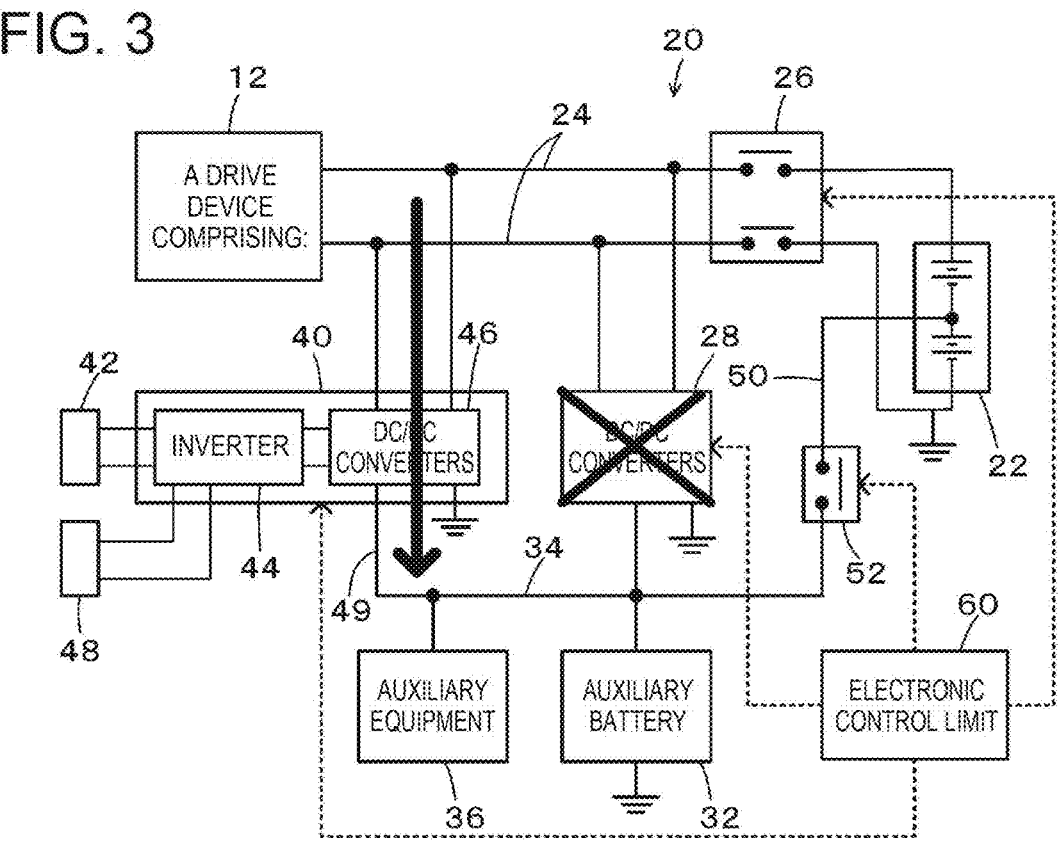
FIG. 3 is an explanatory view schematically showing a state in which DC/DC converter 28 fails and the power of the high-voltage system power line 24 is stepped down by DC/DC converter 46 of the bidirectional charger 40 and supplied to the low-voltage system power line 34.

When it is determined that a failure has occurred in DC/DC converter 28 in S100, DC/DC converter 46 of the bidirectional charger 40 is driven so as to step down the power of the high-voltage system power line 24 and to be supplied to the low-voltage system power line 34 (S110), and the process ends. FIG. 3 schematically shows a state in which DC/DC converter 28 fails and DC/DC converter 46 of the bidirectional charger 40 lowers the power of the high-voltage system power line 24 and supplies it to the low-voltage system power line 34. In the drawing, a cross mark of DC/DC converter 28 indicates a fault, and a solid-line arrow indicates a power supplying direction. Thus, by driving DC/DC converter 46 of the bidirectional charger 40 even if a failure occurs in DC/DC converter 28, the auxiliary device 36 can be driven until the high-voltage battery 22 is almost completely discharged as compared with a condition in which the auxiliary device 36 can only be driven until the auxiliary device battery 32 drops to a voltage capable of driving the auxiliary device 36.

Figure 4:
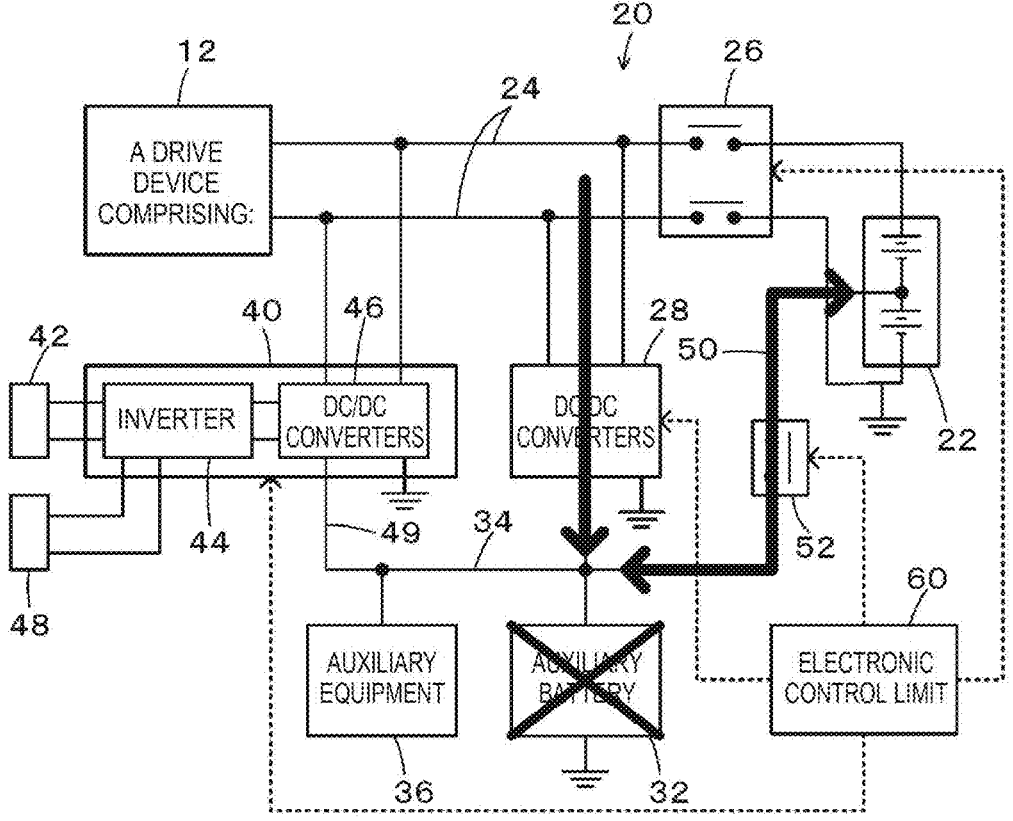
FIG. 4 is an explanatory diagram schematically showing a state in which the auxiliary device battery 32 fails and the intermediate potential part of the reference potential and the equipotential of the auxiliary device battery 32 of the high-voltage battery 22 is connected to the low-voltage system power line 34 by the second connection line 50.

When it is determined that a failure has not occurred in DC/DC converter 28 in S100, it is determined whether or not a failure has occurred in the auxiliary device battery 32 (S120). When it is determined that a failure has occurred in the auxiliary device battery 32, the equipotential connection relay 52 is turned on (S130), and this process is terminated. FIG. 4 schematically illustrates a state in which the auxiliary device battery 32 fails and the low-voltage system power line 34 is connected to an intermediate potential part between the reference potential and the equipotential of the auxiliary device battery 32 of the high-voltage battery 22 by the second connection line 50. In the drawing, the solid-line arrow passing through DC/DC converter 28 indicates the power supply direction, and the solid-line double-directional arrow of the second connection line 50 indicates the power supply. Even if a failure occurs in the auxiliary device battery 32 as described above, the second connection line 50 connects the intermediate potential part of the reference potential and the equipotential of the auxiliary device battery 32 of the high-voltage battery 22 to the low-voltage system power line 34. As a result, the voltage (potential) of the low-voltage system power line 34 can be stabilized even when the power is supplied by DC/DC converter 28 and the power is consumed by the auxiliary device 36.

In the power supply system 20 of the above-described embodiment, when a failure occurs in DC/DC converter 28, DC/DC converter 46 of the bidirectional charger 40 is driven so as to step down the power of the high-voltage system power line 24 and to be supplied to the low-voltage system power line 34. As a result, the auxiliary device 36 can be driven until the high-voltage battery 22 is almost completely discharged as compared with a state in which the auxiliary device battery 32 can only drive the auxiliary device 36 until the voltage drops to a voltage that can drive the auxiliary device 36. Accordingly, DC/DC converter 28 can be stably moved in a relatively long-distance manner even in the event of a failure.

In the power supply system 20 of the embodiment, when a failure occurs in the auxiliary device battery 32, the equipotential connection relay 52 is turned on. As a result, the voltage (potential) of the low-voltage system power line 34 can be stabilized even when the power is supplied by DC/DC converter 28 and the power is consumed by the auxiliary device 36.

In the power supply system 20 of the embodiment, the intermediate potential part of the reference potential and the equipotential of the auxiliary device battery 32 of the high-voltage battery 22 and the low-voltage system power line 34 are connected by the second connection line 50. Further, the equipotential connection relay 52 is provided in the second connection line 50, and the equipotential connection relay 52 is turned on when a failure occurs in the auxiliary device battery 32. However, the second connection line 50 and the equipotential connection relay 52 may not be provided.

The correspondence between the main elements of the embodiments and the main elements of the disclosure described in the column of the means for solving the problem will be described. In the embodiment, the drive device 12 corresponds to a "drive device", the high-voltage system power line 24 corresponds to a "high-voltage system power line", and the high-voltage battery 22 corresponds to a "high-voltage battery". In the embodiment, the auxiliary device 36 corresponds to the "auxiliary machine", the low-voltage system power line 34 corresponds to the "low-voltage system power line", and the auxiliary device battery 32 corresponds to the "low-voltage battery". Further, in the embodiment, DC/DC converter 28 corresponds to the "main power converter", the bidirectional charger 40 corresponds to the "bidirectional charger", the electronic control unit 60 corresponds to the "control device", and DC/DC converter 46 corresponds to the "charger power converter".

Note that the correspondence between the main elements of the embodiment and the main elements of the disclosure described in the section of the means for solving the problem is an example for specifically explaining the embodiment of the disclosure described in the section of the means for solving the problem, and therefore the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the present disclosure has been described above using the embodiment, the present disclosure is not limited to the embodiment in any way, and may be implemented in various modes without departing from the scope of the present disclosure.

The present disclosure is applicable to a manufacturing industry of a power supply system and the like.

What is claimed is:

1. A power supply system, comprising:

a high-voltage battery connected to a drive device through a high-voltage system power line, the drive device being configured to drive a vehicle;

a low-voltage battery connected to an auxiliary device mounted on the vehicle through a low-voltage system power line;

a first power converter that is connected to the high-voltage system power line and the low-voltage system power line, and that is configured to convert a voltage between the high-voltage system power line and the low-voltage system power line bidirectionally;

an inverter connected to an external power supply;

a bidirectional charger that is connected to the high-voltage system power line and the inverter, and is configured to charge the high-voltage battery with external electric power from the external power supply or to supply voltage of the high-voltage battery to an external electric load;

a control device configured to control the first power converter and the bidirectional charger; and a second power converter that is connected to the high-voltage system power line and the low-voltage system power line, and that is configured to step down and supply electric power from the high-voltage system power line to the low-voltage system power line, wherein the bidirectional charger includes the second power converter, and the control device is configured to determine whether a failure has occurred in the first power converter, and in a case where the failure has occurred in the first power converter, control the second power converter so as to step down the electric power of the high-voltage system power line and supply the stepped down electric power to the low-voltage system power line.

2. The power supply system according to claim 1, further comprising:

an equipotential line that connects an intermediate potential part of the high-voltage battery and the low-voltage system power line, the intermediate potential part having a potential equal to a reference potential of the low-voltage system power line; and a relay attached to the equipotential line, wherein the control device is configured to determine whether a failure in the low-voltage battery has occurred, in a case where the failure in the low-voltage battery has occurred, control the relay to be turned on so that electric power is supplied to the low-voltage system power line through the equipotential line.

3. The power supply system according to claim 2, wherein the high-voltage battery is a lithium-ion secondary battery, and the low-voltage battery is a lead-acid battery.

4. The power supply system according to claim 2, further comprising a system main relay disposed between the drive device and the high-voltage battery.

5. The power supply system according to claim 4, wherein the system main relay is disposed between the high-voltage battery and a connection point where the first power converter connects to the high-voltage system power line.

* * * * *